(12) United States Patent
Cheng et al.

(10) Patent No.: US 12,353,047 B2
(45) Date of Patent: Jul. 8, 2025

(54) OPTICAL SYSTEM

(71) Applicant: TDK CORPORATION, Tokyo (JP)

(72) Inventors: Pai-Jui Cheng, Taoyuan (TW);
Chao-Chang Hu, Taoyuan (TW);
Shu-Shan Chen, Taoyuan (TW);
Hsiao-Hsin Hu, Taoyuan (TW);
Chieh-An Chang, Taoyuan (TW)

(73) Assignee: TDK CORPORATION, Tokyo (JP)

( * ) Notice: Subject to any disclaimer, the term of this patent is extended or adjusted under 35 U.S.C. 154(b) by 587 days.

(21) Appl. No.: 17/739,761

(22) Filed: May 9, 2022

(65) Prior Publication Data

US 2022/0357555 A1 Nov. 10, 2022

Related U.S. Application Data

(60) Provisional application No. 63/186,496, filed on May 10, 2021.

(51) Int. Cl.
| | |
|---|---|
| *G02B 7/08* | (2021.01) |
| *G02B 7/00* | (2021.01) |
| *G02B 7/02* | (2021.01) |
| *G02B 7/09* | (2021.01) |
| *G02B 15/14* | (2006.01) |
| *G02B 27/64* | (2006.01) |
| *G03B 3/10* | (2021.01) |
| *G03B 5/02* | (2021.01) |

(Continued)

(52) U.S. Cl.
CPC ............... *G02B 7/08* (2013.01); *G02B 7/005* (2013.01); *G02B 7/021* (2013.01); *G02B 7/022* (2013.01); *G02B 7/023* (2013.01); *G02B 7/09* (2013.01); *G02B 15/142* (2019.08); *G02B 27/646* (2013.01); *G03B 3/10* (2013.01); *G03B 5/02* (2013.01); *H04N 23/54* (2023.01); *H04N 23/55* (2023.01); *G03B 2205/0061* (2013.01)

(58) Field of Classification Search
CPC .......... G02B 7/08; G02B 7/021; G02B 7/022; G02B 7/023; G02B 7/09; G02B 7/005; G02B 15/142; G02B 27/646; H04N 23/54; H04N 23/55; G03B 3/10; G03B 5/02; G03B 2205/0061
USPC ....................................................... 359/824
See application file for complete search history.

(56) References Cited

U.S. PATENT DOCUMENTS

| | | | | |
|---|---|---|---|---|
| 5,101,278 A | * | 3/1992 | Itsumi | G02B 7/102 348/E5.045 |
| 2002/0036443 A1 | * | 3/2002 | Akiba | H04N 23/55 310/309 |

* cited by examiner

*Primary Examiner* — Wyatt A Stoffa
*Assistant Examiner* — Mitchell T Oestreich
(74) *Attorney, Agent, or Firm* — Muncy, Geissler, Olds & Lowe, P.C.

(57) ABSTRACT

An optical system is provided in the present disclosure, including a fixed portion, a first movable portion, a first driving assembly, a second movable portion, and a second driving assembly. The first movable portion is connected to a first optical element. The first movable portion is movable relative to the fixed portion. The first driving assembly drives the first movable portion to move relative to the fixed portion. The second movable portion is connected to a second optical element. The second movable portion is movable relative to the fixed portion and the first movable portion. The second driving assembly drives the second movable portion to move relative to the fixed portion. The first driving assembly provides a first driving force via a first piezoelectric unit. The first movable portion is driven by the first driving force to move relative to the fixed portion.

19 Claims, 9 Drawing Sheets

(51) Int. Cl.
*H04N 23/54* (2023.01)
*H04N 23/55* (2023.01)

OPTICAL SYSTEM

CROSS REFERENCE TO RELATED APPLICATIONS

This application claims the benefit of U.S. Provisional Application No. 63/186,496, filed May 10, 2021, the entirety of which is incorporated by reference herein.

BACKGROUND OF THE INVENTION

Field of the Invention

The present disclosure relates to an optical system, and more particularly to an optical system with optical elements that can be precisely adjusted.

Description of the Related Art

As technology has developed, it has become more common to include image-capturing and video-recording functions into many types of modem electronic devices, such as notebook computers, smartphones, and digital cameras. These electronic devices are used more and more often. In addition to the models that have been developed to be more convenient, thin, and lightweight, it is also desirable to provide optical qualities that are better and more stable, offering consumers more choice.

Electronic devices that have image-capturing or video-recording functions normally include one or more lenses, thereby performing such functions as auto focus (AF), zooming, and optical image stabilization (OIS). Therefore, optical systems often include multiple driving assemblies for driving the optical elements to move. As a result, the present disclosure provides an optical system that is different from the prior art, to improve stability by precisely adjusting the positions of the optical elements while achieving miniaturization of the optical system.

BRIEF SUMMARY OF THE INVENTION

In one embodiment of the present disclosure, an optical system includes a fixed portion, a first movable portion, a first driving assembly, a second movable portion, and a second driving assembly. The first movable portion is connected to a first optical element. The first movable portion is movable relative to the fixed portion. The first driving assembly drives the first movable portion to move relative to the fixed portion. The second movable portion is connected to a second optical element. The second movable portion is movable relative to the fixed portion and the first movable portion. The second driving assembly drives the second movable portion to move relative to the fixed portion. The first driving assembly provides a first driving force via a first piezoelectric unit. The first movable portion is driven by the first driving force to move relative to the fixed portion.

In some embodiments, the first movable portion and the second movable portion are arranged along the optical axis. The first movable portion is movable within a first range of motion relative to the fixed portion. The second movable portion is movable within a second range of motion relative to the fixed portion. The second range of motion is different from the first range of motion. The second movable portion is movable within a third range of motion relative to the first movable portion.

In some embodiments, the first range of motion is wider than the second range of motion.

In some embodiments, the optical system further includes a first stopper assembly, and a second stopper assembly The first stopper assembly defines the movement of the first movable portion relative to the fixed portion. The second stopper assembly defines the movement of the first movable portion relative to the fixed portion. The first stopper assembly includes a first stopper element and a second stopper element. The first stopper element is fixedly disposed at the fixed portion. The second stopper element corresponds to the first stopper element, and is fixedly disposed at the first movable portion. When the first movable portion is in a first terminal position relative to the fixed portion, the first stopper element is in direct contact with the second stopper element. The second stopper assembly includes a third stopper element and a fourth stopper element. The third stopper element is fixedly disposed at the fixed portion. The fourth stopper element corresponds to the third stopper element, and is fixedly disposed at the second movable portion. When the first movable portion is in a second terminal position relative to the fixed portion, the third stopper element is in direct contact with the fourth stopper element. The first terminal position is different from the second terminal position. The range of motion where the first movable portion moves between the first terminal position and the second terminal position is the first range of motion.

In some embodiments, the optical system further includes a third stopper assembly, and a fourth stopper assembly. The third stopper assembly defines the movement of the second movable portion relative to the first movable portion. The fourth stopper assembly defining the movement of the second movable portion relative to the first movable portion. The third stopper assembly includes a fifth stopper element and a sixth stopper element. The fifth stopper element is fixedly disposed at the second movable portion. The sixth stopper element corresponds to the fifth stopper element, and is fixedly disposed at the first movable portion. When the second movable portion is in a third terminal position relative to the first movable portion, the fifth stopper element is in direct contact with the sixth stopper element. The fourth stopper assembly includes a seventh stopper element and an eighth stopper element. The seventh stopper element is fixedly disposed at the second movable portion. The eighth stopper element corresponds to the seventh stopper element, and is fixedly disposed at the first movable portion. When the second movable portion is in a fourth terminal position relative to the first movable portion, the seventh stopper element is in direct contact with the eighth stopper element. The third terminal position is different from the fourth terminal position. The range of motion where the second movable portion moves between the third terminal position and the fourth terminal position is the third range of motion.

In some embodiments, when the fifth stopper element and the sixth stopper element are in contact, the first movable portion may carry the second movable portion in a first motion in the first dimension. When the seventh stopper element and the eighth stopper element are in contact, the first movable portion may carry the second movable portion in a second motion in the first dimension, wherein the first motion and the second motion are in opposite directions.

In some embodiments, the first driving assembly drives the first movable portion to move, and changes the focal lengths of the first optical element and the second optical element, thereby performing the function of zooming. The second driving assembly drives the second movable portion to move, and changes the image planes of the first optical element and the second optical element, thereby performing the function of focusing.

In some embodiments, the first driving assembly drives the first movable portion to move before the second driving assembly drives the second movable portion to move, so that the optical system performs the function of zooming before performing the function of focusing.

In some embodiments, the optical system further includes a first guiding structure guiding the first movable portion to move relative to the fixed portion in a first dimension. The first guiding structure includes a first guiding element with a rod structure, extending in a first direction, and fixedly disposed at the fixed portion.

In some embodiments, the optical system further includes a second guiding structure guiding the second movable portion to move relative to the first movable portion in the first dimension. The second guiding structure includes a second guiding element with a rod structure, extending in the first direction, and fixedly disposed at the first movable portion or the second movable portion.

In some embodiments, the first guiding structure and the second guiding structure do not overlap when viewed in a second direction that is perpendicular to the first direction.

In some embodiments, the first guiding structure and the second guiding structure at least partially overlap when viewed in a third direction that is perpendicular to the first direction and the second direction.

In some embodiments, the first guiding structure and the first piezoelectric unit at least partially overlap when viewed in a second direction that is perpendicular to the first direction.

In some embodiments, the second driving assembly provides a second driving force via a second piezoelectric unit, and the second movable portion is driven by the second driving force to move relative to the first movable portion.

In some embodiments, the first piezoelectric unit and the second piezoelectric unit are located on the same side of the optical axis when viewed in the direction of the optical axis.

In some embodiments, the first piezoelectric unit and the second piezoelectric unit at least partially overlap when viewed in the direction that is perpendicular to the optical axis.

In some embodiments, the first piezoelectric unit and the second piezoelectric unit are located on different sides of the optical axis when viewed in the direction of the optical axis.

In some embodiments, the first driving assembly further includes a first resilient element and a friction element. The first resilient element is fixedly connected to the first movable portion. The friction element is connected to the first resilient element, and is affixed to the first piezoelectric unit by a first clamping force. The first driving assembly secures the position of the first driving assembly relative to the first movable portion via the first resilient element and the friction element.

In some embodiments, the second driving assembly further includes a second resilient element. The second resilient element is fixedly connected to the second movable portion. The second resilient element is affixed to the second piezoelectric unit by a second clamping force, wherein the second driving assembly secures the position of the second driving assembly relative to the second movable portion via the second resilient element. The first clamping force is greater than the second clamping force.

In some embodiments, the second driving assembly provides a second driving force via an electromagnetic unit, and the second movable portion is driven by the second driving force to move relative to the first movable portion. The first piezoelectric unit and the electromagnetic unit are located on different sides of the optical axis when viewed in the direction of the optical axis.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
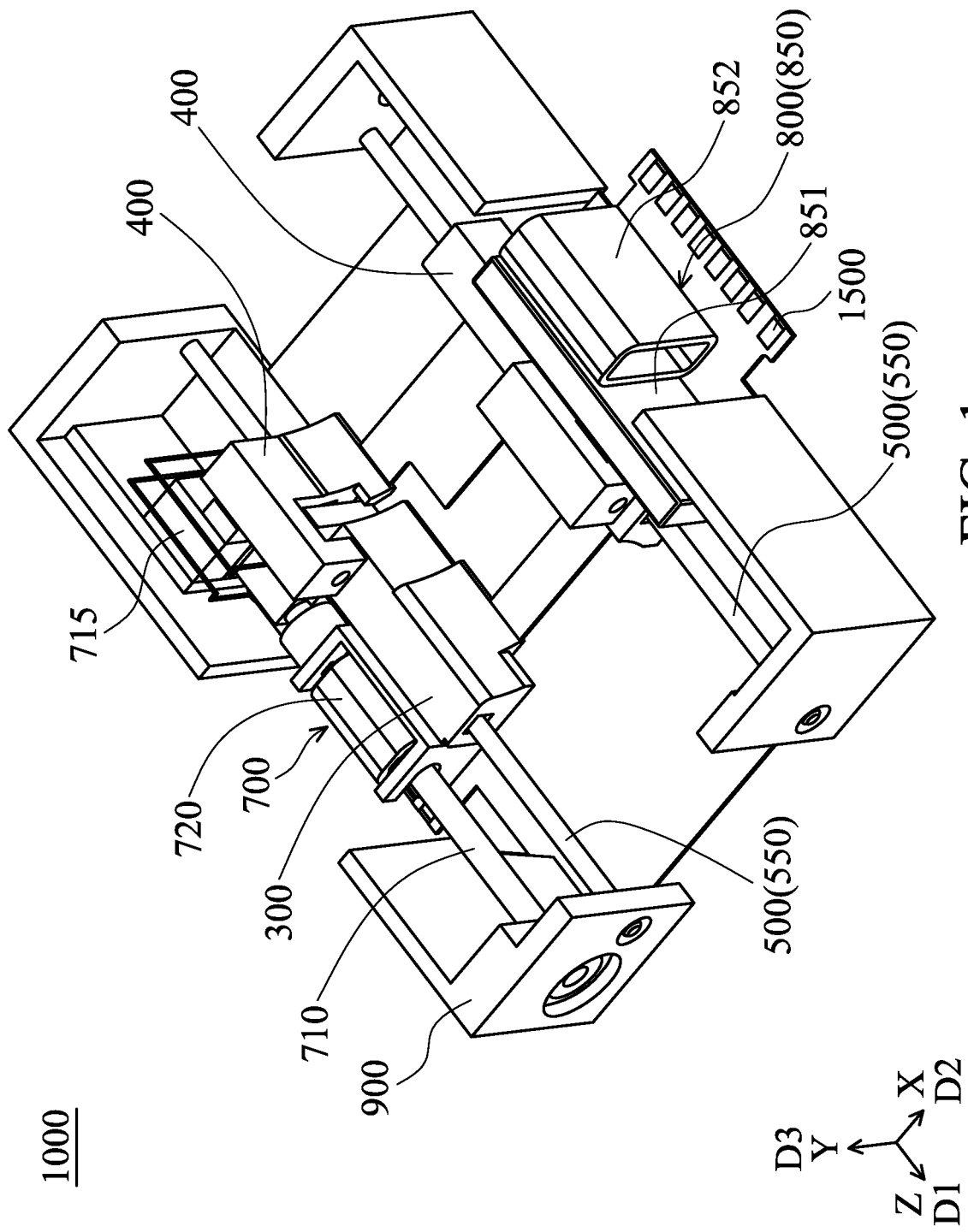
FIG. 1 is a perspective view of the optical system, according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below," "bottom," etc. as well as derivatives thereof (e.g., "downwardly," "upwardly," etc.) are used for ease of the present disclosure of one features relationship to another feature. The spatially relative terms are intended to cover different orientations of the device including the features.

An optical system is provided in the present disclosure, including a plurality of optical elements. These optical elements are movable relative to each other for optical zooming or focusing effects. In some embodiments, during operation, in order to reduce the tilting of optical elements, the first optical element carries the second optical element to move when it does. After the first optical element arrives at the desired position, the second optical element is then finely adjusted, so that the second optical element moves to the desired position. In some embodiments, each of the optical elements in the optical system is connected to a movable portion. Each movable portion is driven to move by a driving assembly (e.g. a driving assembly that includes a piezoelectric unit or an electromagnetic unit). In addition to improving the optical quality of the optical system by finely adjusting the optical elements, the present disclosure achieves miniaturization by the configurations of the driving assemblies it provides.

Referring to FIG. 1, FIG. 1 is a perspective view of the optical system 1000, according to some embodiments of the present disclosure. As shown in FIG. 1, the optical system 1000 mainly includes a first movable portion 300, a second movable portion 400, a first driving assembly 700, a second driving assembly 800, and a fixed portion 900. In some embodiments, the first movable portion 300 may be connected to a first optical element, and the second movable portion 400 may be connected to a second optical element. In some embodiments, the first optical element and the second optical element may each include one or more lenses, forming individual lens groups. In some specific embodiments, the first optical element is for optical zooming, and the second optical element is for optical focusing. Of course, the functions of the first optical element and the second optical element may be adjusted or exchanged based on requirements of users. According to some embodiments of the present disclosure, the first movable portion 300 is movable relative to the fixed portion 900. Thus, the first optical element is movable relative to the fixed portion 900. Similarly, the second movable portion 400 is movable relative to the fixed portion 900 and the first movable portion 300. Thus, the second optical element is movable relative to the fixed portion 900 and the first movable portion 300. In the embodiment shown in FIG. 1, the first movable portion 300 and the first optical element are driven by the first driving assembly 700 to move relative to the fixed portion 900, and the second movable portion 400 and the second optical element are driven by the second driving assembly 800 to move relative to the first movable portion 300. The first driving assembly 700 includes a first piezoelectric element 710. By supplying electric currents to the first piezoelectric element 710, the first piezoelectric element 710 is able to deform in the first direction D1 (Z direction), providing the first driving force. The first driving force drives the first movable portion 300 to move relative to the fixed portion 900.

Figure 2:
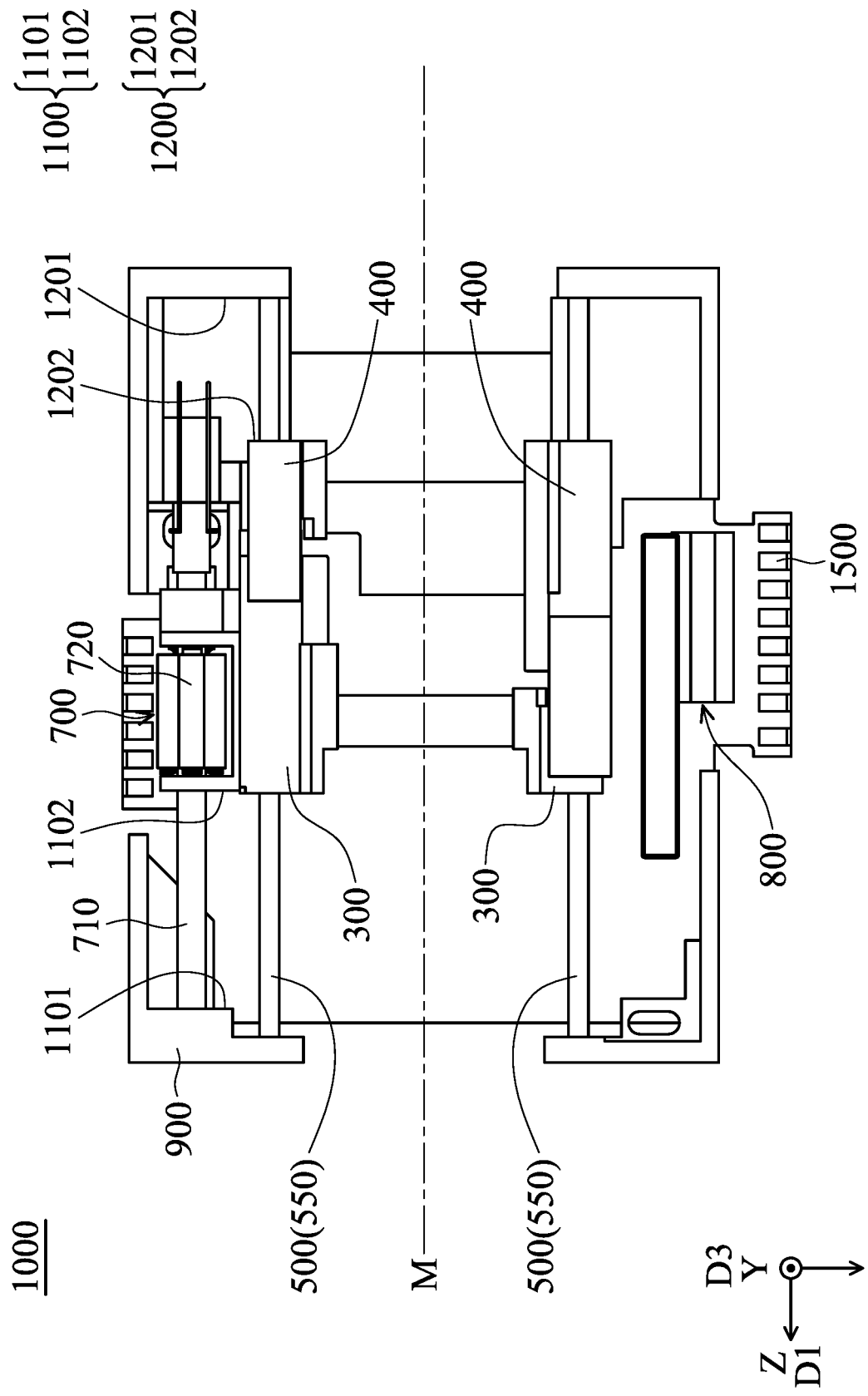
FIG. 2 is a top view of the optical system, according to some embodiments of the present disclosure.

Referring to FIG. 1 and FIG. 2, FIG. 2 is a top view of the optical system 1000, according to some embodiments of the present disclosure. As shown in FIG. 2, the first movable portion 300 and the second movable portion 400 are arranged along the optical axis M. Both the moving directions of the first movable portion 300 and the second movable portion 400 are parallel to the optical axis M. In some embodiments of the present disclosure, the optical axis M is parallel to the first direction D1. In some embodiments, the optical system 1000 further includes a first guiding structure 500, guiding the first movable portion 300 to move relative to the fixed portion 900 in a first dimension. In some embodiments, the a motion in the first dimension is a linear motion in the first direction D1. In the embodiments shown in FIG. 1 and FIG. 2, the first guiding structure 500 includes two first guiding elements 550. The first guiding elements 550 have rod structures and circular cross-sections, extending in the first direction D1, and is fixedly disposed at the fixed portion 900. As shown in FIG. 2, two first guiding elements 550 are disposed parallel to each other. Two first guiding elements 550 at least partially overlap when viewed in the second direction D2. It should be noted that, in some embodiments where the first driving assembly 700 includes first piezoelectric element 710, the first piezoelectric element 710 may replace one of the first guiding elements 550. Specifically, in some embodiments, the first guiding element 550 that is located on the same side of the optical axis M as the first piezoelectric element 710 may be omitted. In such embodiments, the first piezoelectric element 710 may be used to drive the first movable portion 300 to move while guiding its motion in the first direction D1. As a result, the size of the optical system 1000 in the second direction D2 may be further reduced. This is beneficial for miniaturization.

In the embodiments shown in FIG. 1 and FIG. 2, the second driving assembly 800 includes an electromagnetic unit 850. The electromagnetic unit 850 includes a magnetic element 851 and a coil 852. The second movable portion 400 is driven to move relative to the first movable portion 300 by the electromagnetic driving force (i.e. the second driving force) generated between the magnetic element 851 and the coil 852. In such embodiments, the first piezoelectric element 710 and the electromagnetic unit 850 are located on different sides of the optical axis M when viewed in the direction of the optical axis M. In some embodiments, both the first piezoelectric element 710 and the electromagnetic unit 850 are connected to the circuit assembly 1500. Through the circuit assembly 1500, the first piezoelectric element 710 and the electromagnetic unit 850 are connected to an external control assembly (not shown). The control assembly inputs control signals to the first piezoelectric element 710 and the electromagnetic unit 850, thereby controlling the motion of the first movable portion 300 and the second movable portion 400.

Figure 3:
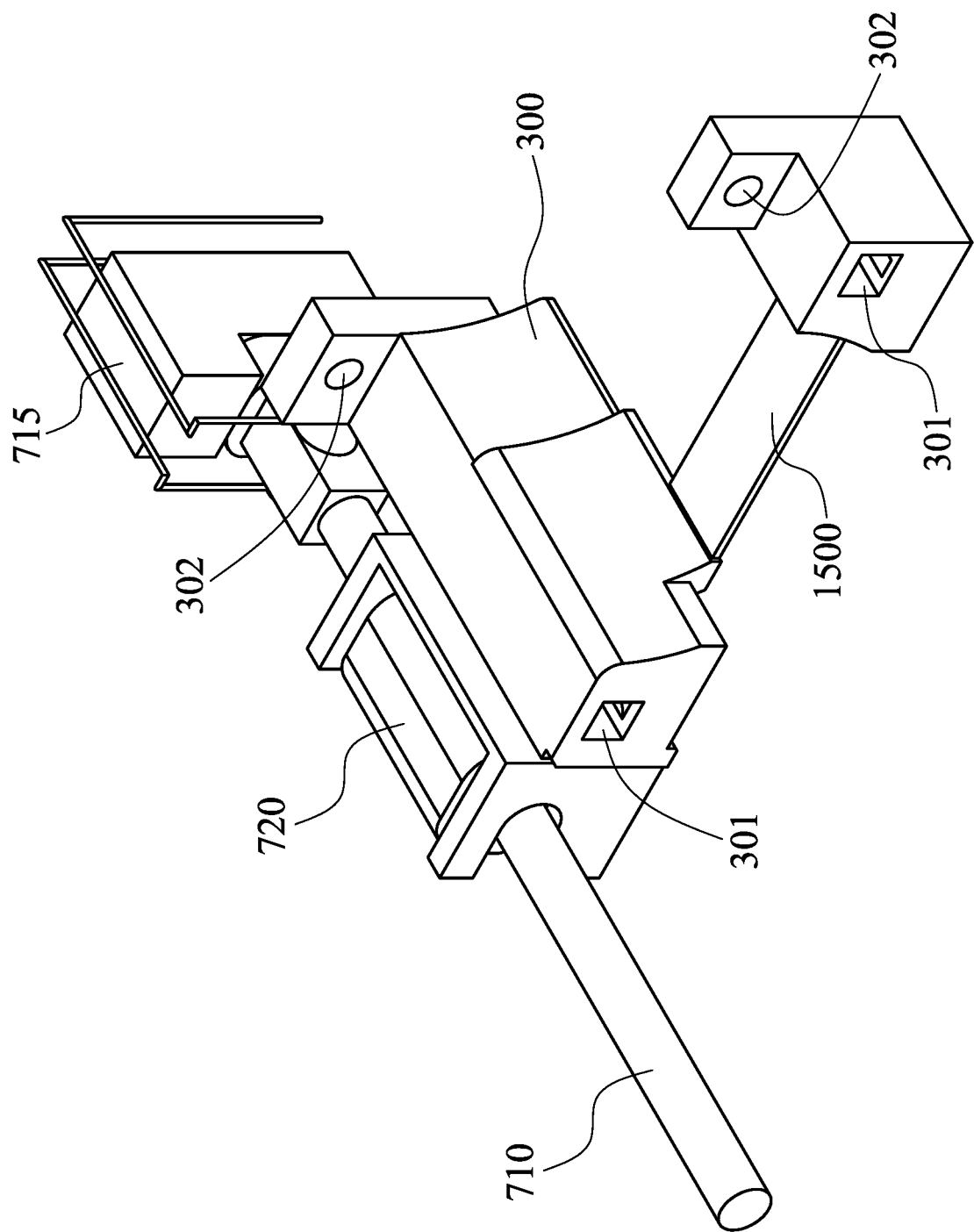
FIG. 3 is a schematic view of the first movable portion and the first driving assembly of the optical system, according to some embodiments of the present disclosure.

Next, referring to FIG. 3, FIG. 3 is a schematic view of the first movable portion 300 and the first driving assembly 700 of the optical system 1000, according to some embodiments of the present disclosure. As shown in FIG. 3, the first movable portion 300 includes two first openings 301, corresponding to the two first guiding elements 550, respectively. As mentioned above, in some embodiments where only one of the first guiding elements 550 is included, the first movable portion 300 only includes one first opening 301.

As shown in FIG. 3, the first driving assembly 700 further includes a first piezoelectric driving element 715 and a first resilient element 720. The first piezoelectric driving element 715 may be connected to the external control assembly (not shown) via a plurality of wires (e.g. the two wires as shown in FIG. 3). The control assembly inputs different control signals to the first piezoelectric driving element 715 via the wires, thereby driving the first piezoelectric element 710 to deform in different directions (e.g. in +Z direction or in −Z direction) in the first direction D1. The first resilient element 720 is fixedly connected to the first movable portion 300. That is, the first movable portion 300 is clamped on the first piezoelectric element 710 via the first resilient element 720. As such, the first movable portion 300 is movable relative to the fixed portion 900 in the first direction D1 as the first piezoelectric element 710 deforms.

Figure 4:
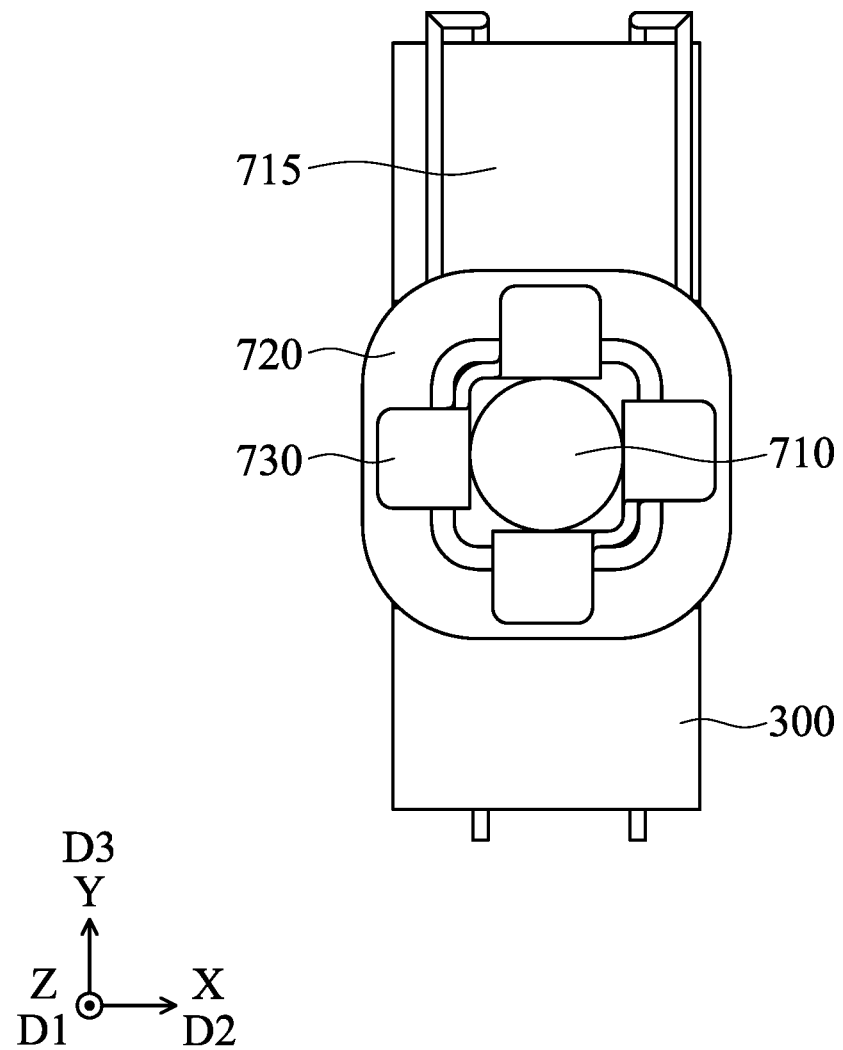
FIG. 4 is a partial side view of the first movable portion and the first driving assembly of the optical system, according to some embodiments of the present disclosure.

Next, referring to FIG. 4, FIG. 4 is a partial side view of the first movable portion 300 and the first driving assembly 700 of the optical system 1000, according to some embodiments of the present disclosure. In some specific embodiments, the first driving assembly 700 further includes a friction element 730. The friction element 730 is connected to the first resilient element 720, and is disposed between the first resilient element 720 and the first piezoelectric element 710. The friction element 730 provides a first clamping force, which secures the first resilient element 720 on the first piezoelectric element 710. In other words, the first driving assembly 700 secures the position of the first driving assembly 700 relative to the first movable portion 300 via the first resilient element 720 and the friction element 730. After the first movable portion 300 moves to the its desired position that achieves zooming effects, the first resilient element 720 and the friction element 730 maintain the position of the first movable portion 300, preventing the position of the first movable portion 300 from being changed by external impact or shaking.

Figure 5:
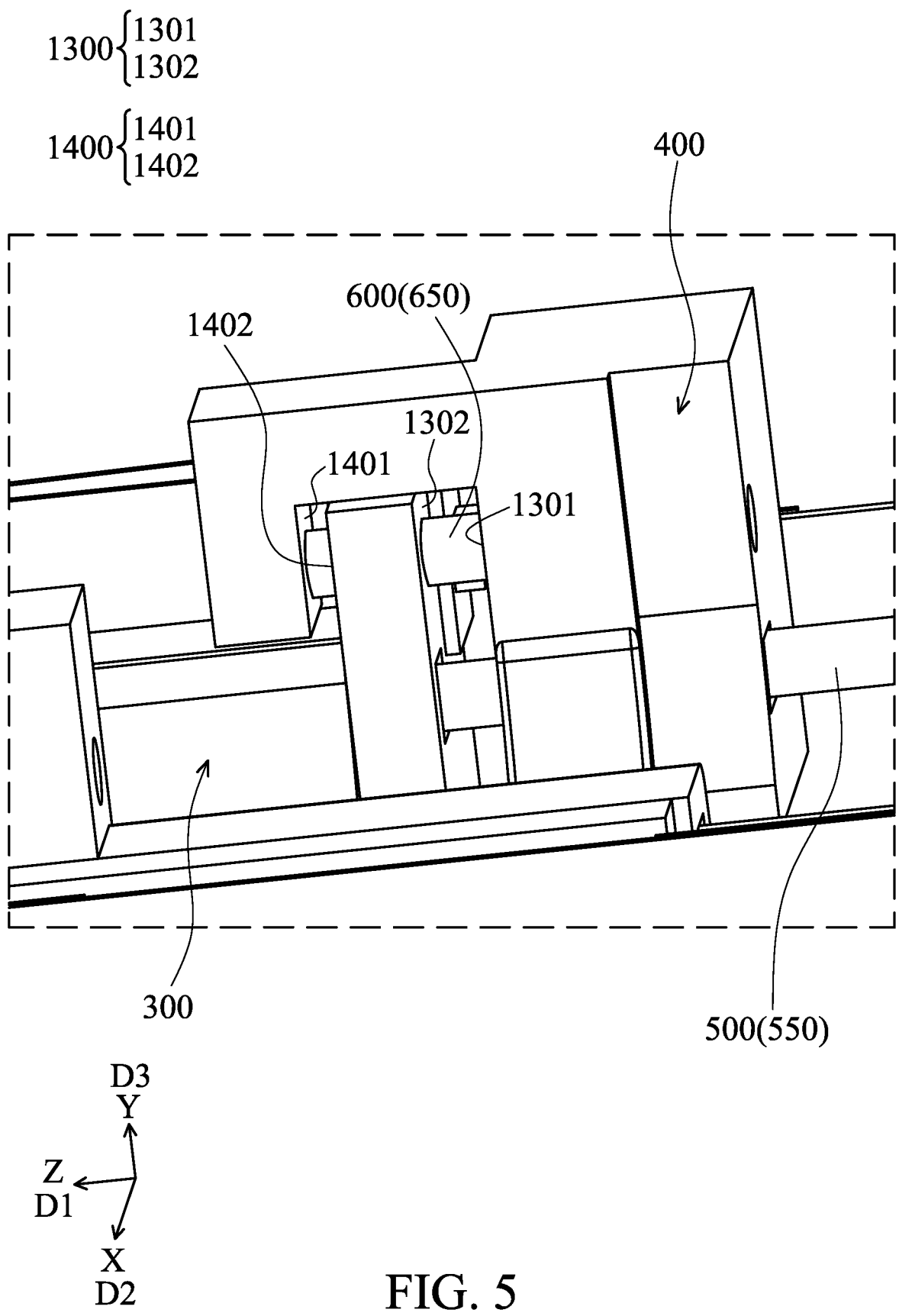
FIG. 5 is a schematic view of the optical system, showing the connection between the first movable portion and the second movable portion, according to some embodiments of the present disclosure.

Next, referring to FIG. 1, FIG. 3, and FIG. 5, FIG. 5 is a schematic view of the optical system 1000, showing the connection between the first movable portion 300 and the second movable portion 400, according to some embodiments of the present disclosure. As shown in FIG. 5, in some embodiments, the optical system 1000 further includes a second guiding structure 600, guiding the second movable portion 400 to move relative to the first movable portion 300 in the first dimension. In the embodiments shown in FIG. 1 through FIG. 3, the second guiding structure 600 includes two second guiding elements 650, wherein one of the second guiding elements 650 is shown in FIG. 5. The second guiding elements 650 have rod structures and circular cross-sections, extending in the first direction D1. In the embodiment shown in FIG. 5, the second guiding element 650 is fixedly disposed at the second movable portion 400. However, in some other embodiments, the second guiding element may be fixedly disposed at the first movable portion 300. As shown in FIG. 3, the first movable portion 300 includes two second openings 302, corresponding to the two second guiding elements 650, respectively. In some embodiments, two second guiding elements 650 are disposed parallel to each other. Two second guiding elements 650 do not overlap when viewed in the second direction D2.

In some embodiments, the first guiding structure 500 and the second guiding structure 600 do not overlap when viewed in the second direction D2. The first guiding structure 500 and the second guiding structure 600 at least partially overlap when viewed in the third direction D3. Specifically, the first guiding structure 500 and the second guiding structure 600 may be arranged along the third direction D3, and the second guiding structure 600 is closer to the +Y direction than the first guiding structure 500. However, in some other embodiment, the second guiding structure 600 may be closer to the −Y direction than the first guiding structure 500. In some embodiments, the first guiding structure 500 and the first piezoelectric element 710 at least partially overlap when viewed in the second direction D2. It should be noted that, no matter the first guiding structure 500 includes one or two of the first guiding elements 550, the first guiding element(s) 550 and the first piezoelectric element 710 at least partially overlap when viewed in the second direction D2.

Referring to FIG. 2 and FIG. 5, in some embodiments, the optical system 1000 further includes a first stopper assembly 1100, a second stopper assembly 1200, a third stopper assembly 1300, and a fourth stopper assembly 1400. The first stopper assembly 1100 and the second stopper assembly 1200 define the movement of the first movable portion 300 relative to the fixed portion 900. As shown in FIG. 2, the first stopper assembly 1100 includes a first stopper element 1101 and a second stopper element 1102, and the second stopper assembly 1200 includes a third stopper element 1201 and a fourth stopper element 1202.

The first stopper element 1101 is fixedly disposed at the fixed portion 900. For example, the first stopper element 1101 may be a surface of the fixed portion 900 that faces the first movable portion 300. The second stopper element 1102 corresponds to the first stopper element 1101, and is fixedly disposed at the first movable portion 300. For example, the second stopper element 1102 may be a surface of the first movable portion 300 that faces the fixed portion 900. In some embodiments, the optical system 1000 may include two sets of first stopper assemblies 1100 respectively disposed at different sides of the optical axis M. In some embodiments, when the first movable portion 300 is in the first terminal position relative to the fixed portion 900, the first stopper element 1101 is in direct contact with the second stopper element 1102. The range of motion of the first movable portion 300 is limited by the surface contact between the first stopper element 1101 and the second stopper element 1102.

The second stopper assembly 1200 is disposed on the opposite side from the first stopper assembly 1100. The third stopper element 1201 is fixedly disposed at the fixed portion 900. For example, the third stopper element 1201 may be a surface of the fixed portion 900 that faces the second movable portion 400. The fourth stopper element 1202 corresponds to the third stopper element 1201, and is fixedly disposed at the second movable portion 400. For example, the fourth stopper element 1202 may be a surface of the second movable portion 400 that faces the fixed portion 900. In some embodiments, the optical system 1000 may include two sets of second stopper assemblies 1200 respectively disposed at different sides of the optical axis M. In some embodiments, when the first movable portion 300 is in the second terminal position relative to the fixed portion 900, the third stopper element 1201 is in direct contact with the fourth stopper element 1202. The range of motion of the second movable portion 400 (and thus the first movable portion 300) is limited by the surface contact between the third stopper element 1201 and the fourth stopper element 1202. The first terminal position and the second terminal position of the first movable portion 300 are different.

The third stopper assembly 1300 and the fourth stopper assembly 1400 define the movement of the second movable portion 400 relative to the first movable portion 300. As shown in FIG. 5, the third stopper assembly 1300 includes a fifth stopper element 1301 and a sixth stopper element 1302, and the fourth stopper assembly 1400 includes a seventh stopper element 1401 and an eighth stopper element 1402.

The fifth stopper element 1301 is fixedly disposed at the second movable portion 400. For example, the fifth stopper element 1301 may be a surface of the second movable portion 400 that faces the first movable portion 300. The sixth stopper element 1302 corresponds to the fifth stopper element 1301, and is fixedly disposed at the first movable portion 300. For example, the sixth stopper element 1302 may be a surface of the first movable portion 300 that faces the second movable portion 400. In some embodiments, the optical system 1000 may include two sets of third stopper assemblies 1300 respectively disposed at different sides of the optical axis M. FIG. 5 only shows one of the third stopper assemblies 1300. In some embodiments, when the second movable portion 400 is in the third terminal position relative to the first movable portion 300, the fifth stopper element 1301 is in direct contact with the sixth stopper element 1302. The range of motion of the second movable portion 400 relative to the first movable portion 300 is limited by the surface contact between the fifth stopper element 1301 and the sixth stopper element 1302.

The fourth stopper assembly 1400 is disposed on the opposite side from the third stopper assembly 1300. The seventh stopper element 1401 is fixedly disposed at the second movable portion 400. For example, the seventh stopper element 1401 may be another surface of the second movable portion 400 that faces the first movable portion 300. The eighth stopper element 1402 corresponds to the seventh stopper element 1401, and is fixedly disposed at the first movable portion 300. For example, the eighth stopper element 1402 may be another surface of the first movable portion 300 that faces the second movable portion 400. In some embodiments, the optical system 1000 may include two sets of fourth stopper assemblies 1400 respectively disposed at different sides of the optical axis M. FIG. 5 only shows one of the fourth stopper assemblies 1400. In some embodiments, when the second movable portion 400 is in the fourth terminal position relative to the first movable portion 300, the seventh stopper element 1401 is in direct contact with the eighth stopper element 1402. The range of motion of the second movable portion 400 relative to the first movable portion 300 is limited by the surface contact between the seventh stopper element 1401 and the eighth stopper element 1402. The third terminal position and the fourth terminal position of the second movable portion 400 are different.

In some embodiments according to the present disclosure, the first movable portion 300 is movable within the range of motion defined by the first stopper element 1101 and the third stopper element 1201. The second movable portion 400 is movable within the range of motion defined by the fifth stopper element 1301 and the seventh stopper element 1401. Specifically, when the fifth stopper element 1301 is in contact with the sixth stopper element 1302, the second movable portion 400 reaches the third terminal position. However, the first movable portion 300 may not be in either the first terminal position or the second terminal position at this time. Therefore, the first movable portion 300 may carry the second movable portion 400 in the first motion (e.g. along the −Z direction) relative to the fixed portion 900 in the first dimension until the first movable portion 300 reaches the second terminal position (when the third stopper element 1201 is in contact with the fourth stopper element 1202) and stops. Similarly, when the seventh stopper element 1401 is in contact with the eighth stopper element 1402, the first movable portion 300 may carry the second movable portion 400 in the second motion (e.g. along the +Z direction) relative to the fixed portion 900 in the first dimension until the first movable portion 300 reaches the first terminal position (when the first stopper element 1101 is in contact with the second stopper element 1102) and stops. The directions of the first motion and the second motion are opposite from each other.

In other words, during movements of the first movable portion 300, the fifth stopper element 1301 may be in contact with the sixth stopper element 1302, or the seventh stopper element 1401 may be in contact with the eighth stopper element 1402. When either contact happens, the first movable portion 300 may carry the second movable portion 400 to move together relative to the fixed portion 900 until the first movable portion 300 reaches the desired position and stop together. After the first movable portion 300 stops, the second movable portion 400 may be separately moved to the desired position to obtain desired optical effects. Specifically, the first driving assembly 700 drives the first movable portion 300 to move, and changes the focal lengths of the first optical element and the second optical element, thereby the optical system 1000 performs the function of zooming. The second driving assembly 800 drives the second movable portion 400 to move, and changes the image planes of the first optical element and the second optical element, thereby the optical system 1000 performs the function of focusing. In such embodiments, the first driving assembly 700 drives the first movable portion 300 to move to its desired position before the second driving assembly 800 drives the second movable portion 400 to move to its desired position. In other words, users may control the optical system 1000 to perform the function of zooming before performing the function of focusing. As such, good optical effects may be achieved by the precise position control.

In the present disclosure, the range of motion of the first movable portion 300 between the first stopper element 1101 and the third stopper element 1201 is defined as the first range of motion. That is, the range of motion where the first movable portion 300 moves between the first terminal position and the second terminal position is the first range of motion. In other words, the first movable portion 300 is movable within the first range of motion relative to the fixed portion 900. The range of motion of the second movable portion 400 along with the first movable portion 300 between the first stopper element 1101 and the third stopper element 1201 is defined as the second range of motion. The second movable portion 400 is movable within the second range of motion relative to the fixed portion 900. The first range of motion is different from the second range of motion. The range of motion of the second movable portion 400 between the fifth stopper element 1301 and the seventh stopper element 1401 is defined as the third range of motion. That is, the range of motion where the second movable portion 400 moves between the third terminal position and the fourth terminal position is the third range of motion. The second movable portion 400 is movable within the third range of motion relative to the first movable portion 300. In some embodiments according to the present disclosure, the movements of the first movable portion 300 and the second movable portion 400 are in Z direction. In some embodiments, the first range of motion is different from the second range of motion, for example, the first range of motion is wider than the second range of motion. In some embodiments, the third range of motion is smaller than the first range of motion.

Although in the optical system 1000 illustrated in FIG. 1 and FIG. 2, the first driving assembly 700 for driving the first movable portion 300 includes the first piezoelectric element 710, and the second driving assembly 800 for driving the second movable portion 400 includes the electromagnetic unit 850, in some other embodiments, the piezoelectric unit and the electromagnetic unit may be exchanged. That is, a piezoelectric unit may be used to drive the first movable portion 300 to move while an electromagnetic unit may be used to drive the second movable portion 400 to move, depending on the requirements of users.

Figure 6:
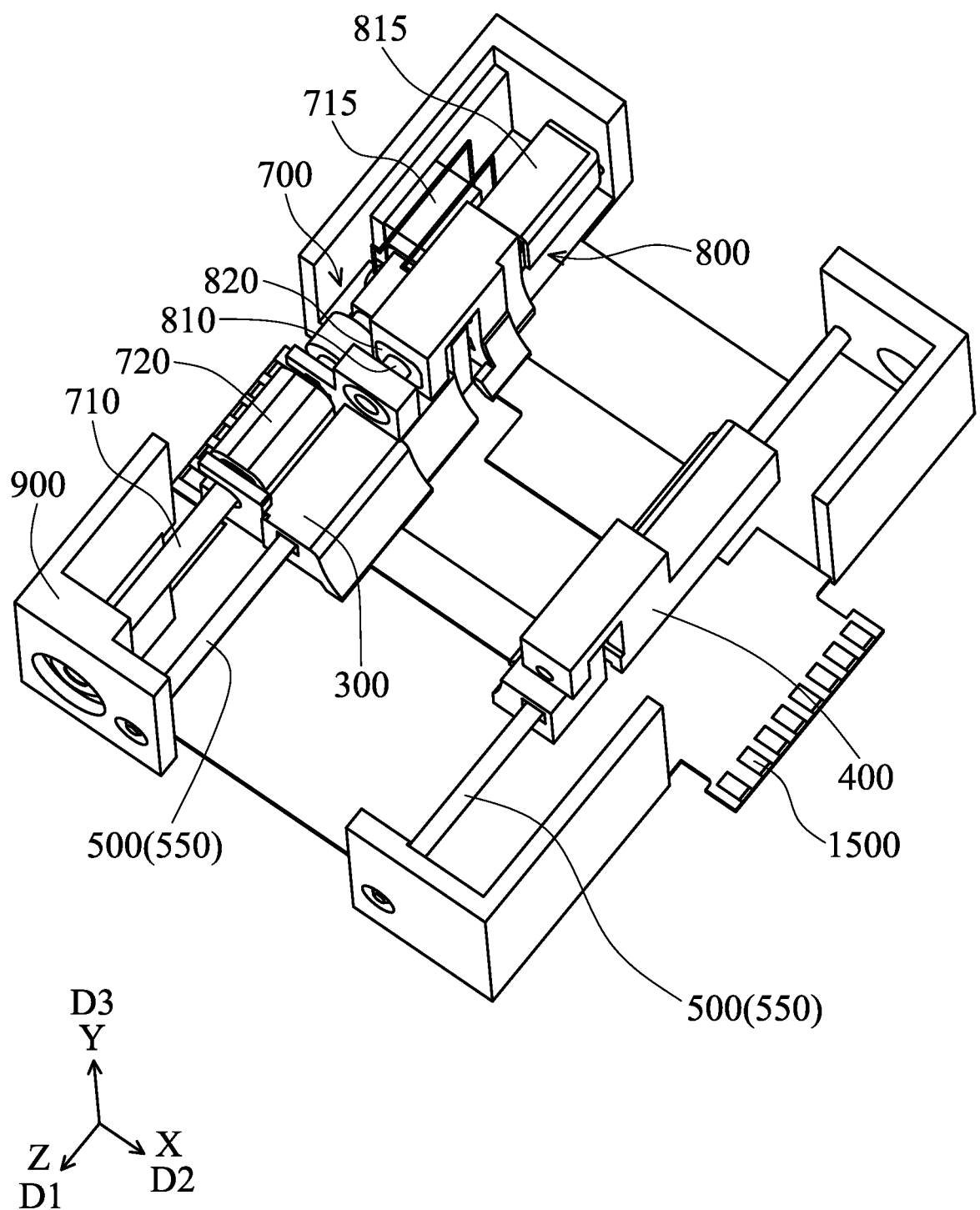
FIG. 6 is a perspective view of the optical system, according to some other embodiments of the present disclosure.
Figure 7:
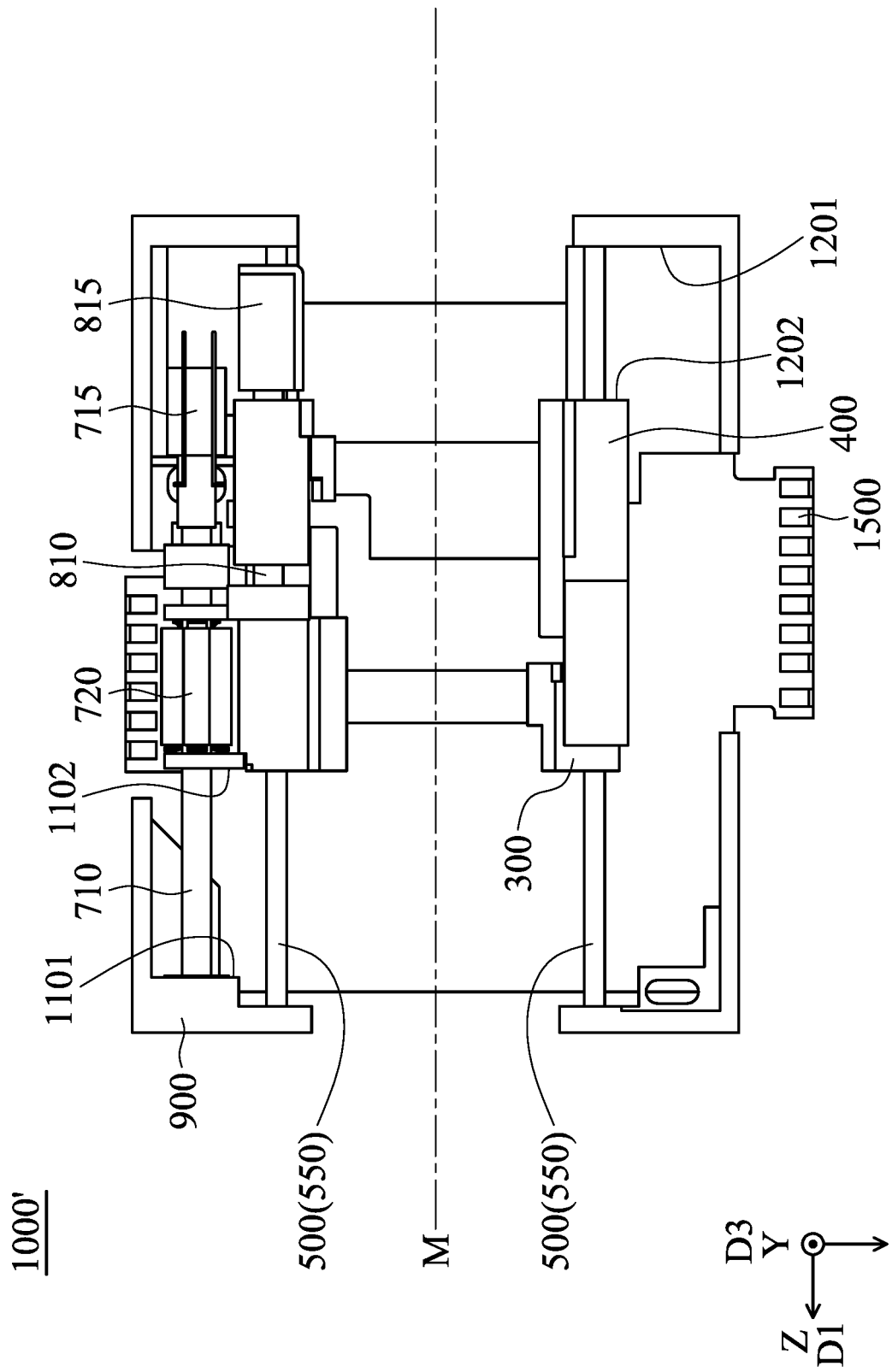
FIG. 7 is a top view of the optical system, according to some other embodiments of the present disclosure.

Referring to FIG. 6 and FIG. 7, FIG. 6 and FIG. 7 are a perspective view and a top view of the optical system 1000', according to some other embodiments of the present disclosure. The optical system 1000' has similar structures and features as the optical system 1000 described with regard to FIG. 1 to FIG. 5. Their difference is that the second driving assembly 800 of the optical system 1000' includes a second piezoelectric unit 810. By supplying electric currents to the second piezoelectric unit 810, the second piezoelectric unit 810 is able to deform in the first direction D1 (Z direction), providing the second driving force. The second driving force drives the second movable portion 400 to move relative to the first movable portion 300. The first piezoelectric element 710 and the second piezoelectric unit 810 are located on the same side of the optical axis M when viewed in the direction of the optical axis M. The first piezoelectric element 710 and the second piezoelectric unit 810 at least partially overlap when viewed in the second direction D2 that is perpendicular to the optical axis M. By disposing the first driving assembly 700 and the second driving assembly 800 on the same side of the optical axis M, the size of the optical system 1000' in the second direction D2 may be significantly reduced, achieving great effects of miniaturization. However, in some other embodiments, the second driving assembly 800 that includes the second piezoelectric unit 810 may be disposed on another side of the optical axis M, depending on user requirements.

Figure 8:
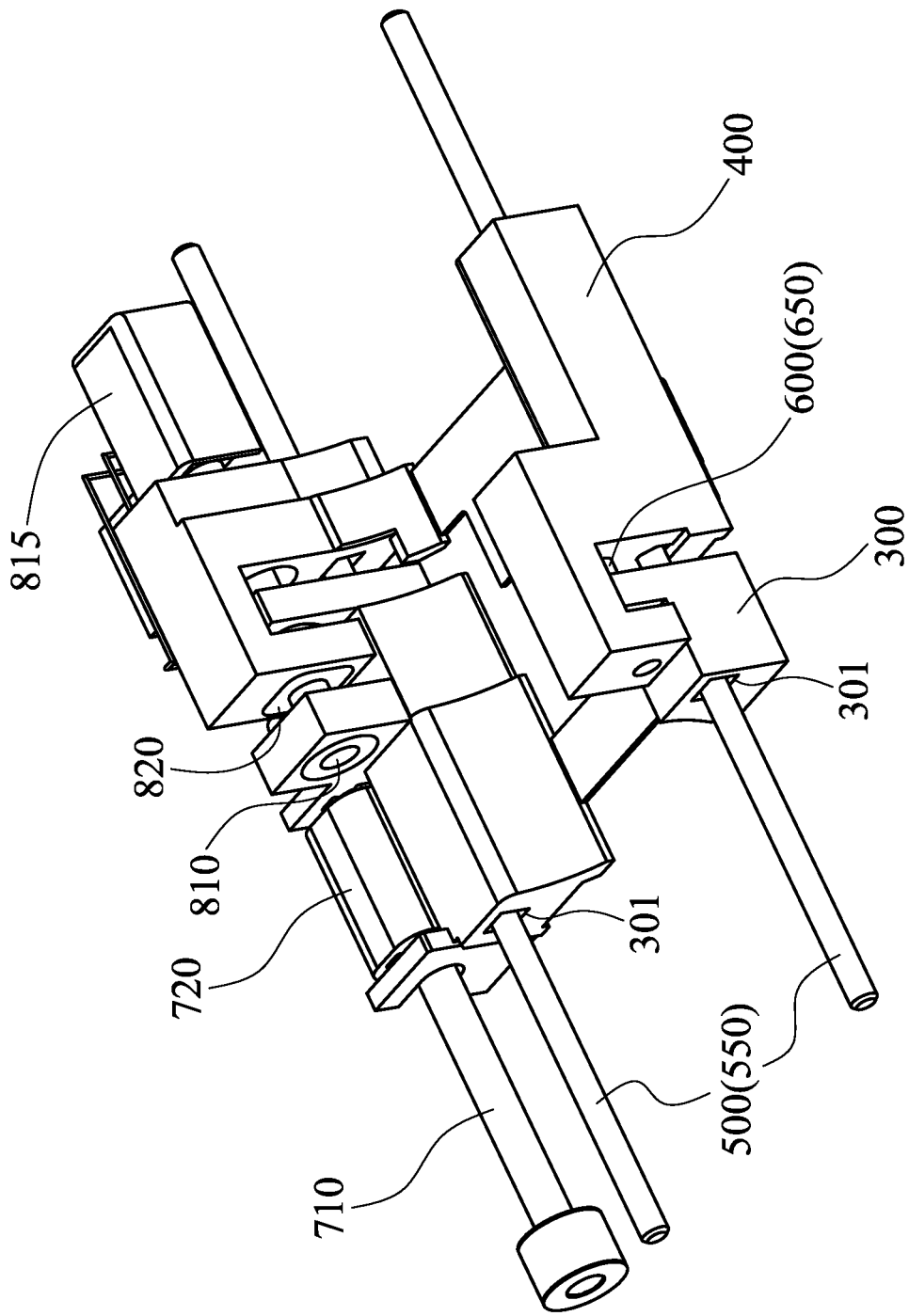
FIG. 8 is a partial left perspective view of the optical system, according to some other embodiments of the present disclosure.
Figure 9:
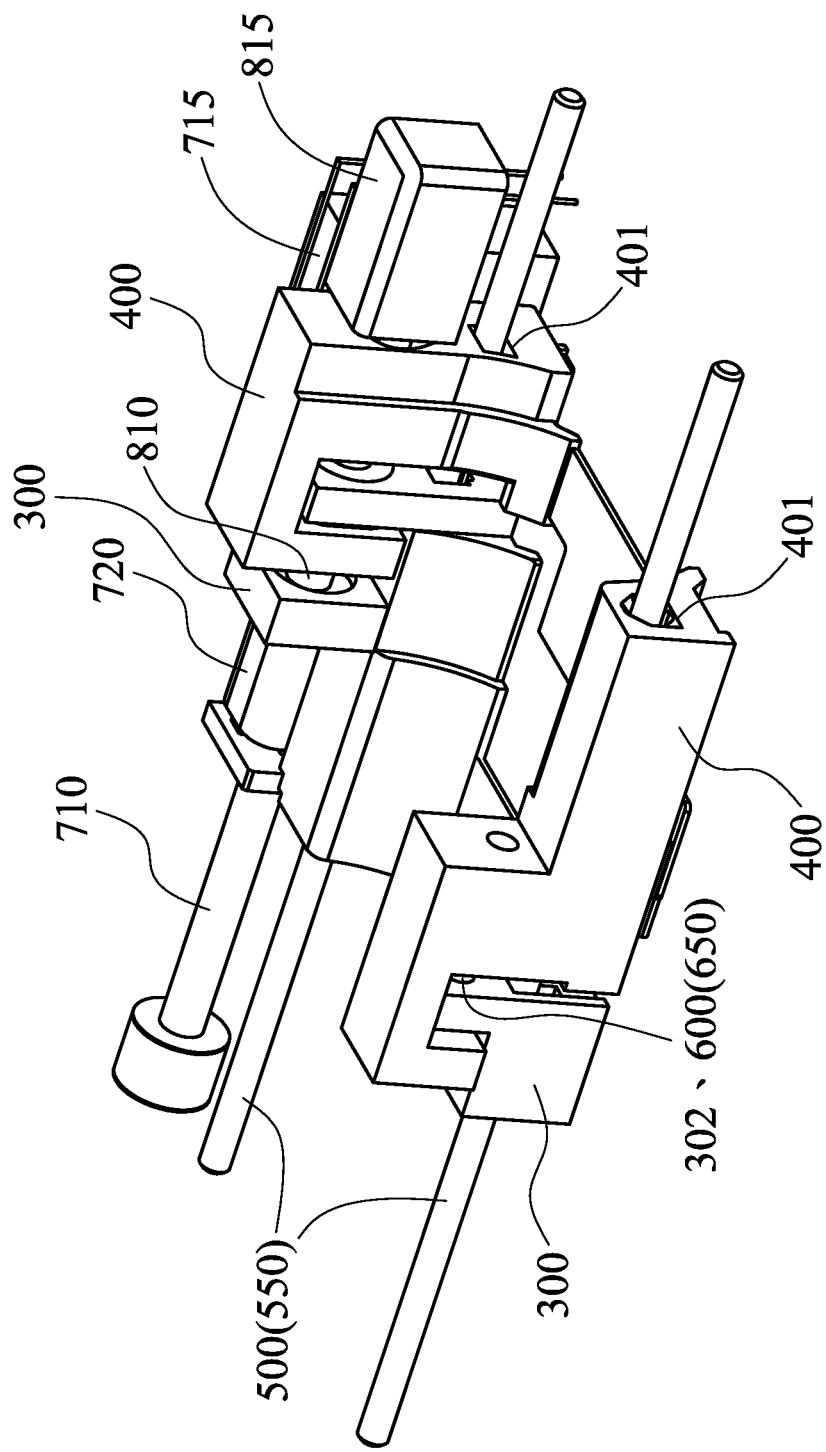
FIG. 9 is a partial right perspective view of the optical system, according to some other embodiments of the present disclosure.

Next, referring to FIG. 8 and FIG. 9, FIG. 8 and FIG. 9 are a partial left perspective view and a partial right perspective view of the optical system 1000', respectively, according to some other embodiments of the present disclosure. As shown in FIG. 8, the second driving assembly 800 further includes a second piezoelectric driving element 815 and a second resilient element 820. The second piezoelectric driving element 815 may be connected to the external control assembly (not shown) via a plurality of wires (e.g. two wires). The control assembly inputs different control signals to the second piezoelectric driving element 815 via the wires, thereby driving the second piezoelectric unit 810 to deform in different directions (e.g. in +Z direction or in –Z direction) in the first direction D1. The second resilient element 820 is fixedly connected to the second movable portion 400. That is, the second movable portion 400 is clamped on the second piezoelectric unit 810 via the second resilient element 820. As such, the second movable portion 400 is movable relative to the first movable portion 300 in the first direction D1 as the second piezoelectric unit 810 deforms. The second resilient element 820 provides a second clamping force, which secures the second movable portion 400 on the second piezoelectric unit 810. In other words, the second driving assembly 800 secures the position of the second driving assembly 800 relative to the second movable portion 400 via the second resilient element 820. After the second movable portion 400 moves to the its desired position that achieves focusing effects, the second resilient element 820 maintains the position of the second movable portion 400, preventing the position of the second movable portion 400 from being changed by external impact or shaking. In some embodiments, the first clamping force provided by the friction element 730 is greater than the second clamping force provided by the second resilient element 820. This is helpful for improving the overall mechanism stability.

In some embodiments according to the present disclosure, the first piezoelectric element 710 of the first driving assembly 700 and the second piezoelectric unit 810 of the second driving assembly 800 are made of carbon rods. The carbon rods may be used as the elements that stretch and deform in the first direction D1. However, in some other embodiments, the first piezoelectric element 710 and the second piezoelectric unit 810 may include other suitable materials. In some embodiments according to the present disclosure, the first resilient element 720 of the first driving assembly 700 and the second resilient element 820 of the second driving assembly 800 are made of rubber. The rubber may be used as the element that clamps onto the first piezoelectric element 710 and the second piezoelectric unit 810. However, in some other embodiments, the first resilient element 720 and the second resilient element 820 may include other suitable materials. In some embodiments according to the present disclosure, the friction element 730 of the first driving assembly 700 is made from multiple iron sheets. The iron sheets are used as the elements that further clamp onto the first piezoelectric element 710. However, in some other embodiments, the friction element 730 may include other suitable materials.

It should be noted that, in some embodiments where the second driving assembly 800 includes the second piezoelectric unit 810 (e.g. the optical system 1000' shown in FIG. 6 to FIG. 9), the second piezoelectric unit 810 is fixedly disposed at the first movable portion 300. In some embodiments, the second piezoelectric unit 810 may replace one of the second guiding elements 650. Specifically, in some embodiments, the second guiding element 650 that is located on the same side of the optical axis M as the second piezoelectric unit 810 may be omitted. In such embodiments, the second piezoelectric unit 810 may be used to drive the second movable portion 400 to move while guiding its motion in the first direction D1. Additionally, in such embodiments, as shown in FIG. 9, the first movable portion 300 only has one second opening 302 for the second guiding element 650 to pass through. The second movable portion 400 has another opening for the second piezoelectric unit 810 to pass through. By replacing one of the second guiding elements 650 with the second piezoelectric unit 810, the size of the optical system 1000' in the second direction D2 may be further reduced, which is advantageous to miniaturization. In addition, as shown in FIG. 9, in some embodiments, the second movable portion 400 may have two third openings 401, respectively disposed on two different sides of the optical axis M for the first guiding elements 550 to pass through.

In addition, in yet some other embodiments, the optical system 1000' that is illustrated in FIG. 6 through FIG. 9 may be further modified. For example, as mentioned above, the first guiding element 550 that is located on the same side of the optical axis M as the first piezoelectric element 710 may be replaced by the first piezoelectric element 710. Furthermore, in such embodiments, the second driving assembly 800 may be disposed above the first driving assembly 700, so that the first driving assembly 700 and the second driving assembly 800 at least partially overlap when viewed in the third direction D3. As a result, the size of the optical system 1000' in the second direction D2 may be further reduced, which is even more advantageous to miniaturization.

In summary, the optical system 1000 of the present disclosure includes a plurality of optical elements (e.g. the first optical element and the second optical element) that are driven by a plurality of driving assemblies (e.g. the first driving assembly 700 and the second driving assembly 800)

to move relative to the fixed portion 900 and/or to each other, achieving effects of optical zooming or optical focusing, or the like. A plurality of stopper assemblies (e.g. the first stopper assembly 1100, the second stopper assembly 1200, the third stopper assembly 1300, and the fourth stopper assembly 1400) are disposed so that the second movable portion 400 may be carried by the first movable portion 300 to move together. After the first movable portion 300 and the first optical element reaches their position, then the second movable portion 400 and the second optical element are finely adjusted. In addition, one of the first driving assembly 700 and the second driving assembly 800 provided in the present disclosure includes a piezoelectric unit. The piezoelectric unit may replace the guiding element located on the same side, in order to reduce the size in a certain direction. Furthermore, the first driving assembly 700 and the second driving assembly 800 may overlap, achieving better miniaturization. As a result, the precision of control, miniaturization, and the stability of the overall mechanism may be efficiently improved, providing a better optical quality.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical system, comprising:
   a fixed portion;
   a first movable portion connected to a first optical element, wherein the first movable portion is movable relative to the fixed portion;
   a first driving assembly driving the first movable portion to move relative to the fixed portion;
   a second movable portion connected to a second optical element, wherein the second movable portion is movable relative to the fixed portion and the first movable portion; and
   a second driving assembly driving the second movable portion to move relative to the first movable portion;
   wherein the first driving assembly provides a first driving force via a first piezoelectric unit, and the first movable portion is driven by the first driving force to move relative to the fixed portion;
   wherein:
   the first movable portion and the second movable portion are arranged along an optical axis;
   the first movable portion is movable within a first range of motion relative to the fixed portion;
   the second movable portion is movable within a second range of motion relative to the fixed portion, wherein the second range of motion is different from the first range of motion; and
   the second movable portion is movable within a third range of motion relative to the first movable portion.

2. The optical system as claimed in claim 1, wherein the first range of motion is wider than the second range of motion.

3. The optical system as claimed in claim 1, further comprising:
   a first stopper assembly defining the movement of the first movable portion relative to the fixed portion, comprising:
   a first stopper element fixedly disposed at the fixed portion; and
   a second stopper element, corresponding to the first stopper element, fixedly disposed at the first movable portion;
   wherein when the first movable portion is in a first terminal position relative to the fixed portion, the first stopper element is in direct contact with the second stopper element; and
   a second stopper assembly defining the movement of the first movable portion relative to the fixed portion, comprising:
   a third stopper element fixedly disposed at the fixed portion; and
   a fourth stopper element, corresponding to the third stopper element, fixedly disposed at the second movable portion;
   wherein when the first movable portion is in a second terminal position relative to the fixed portion, the third stopper element is in direct contact with the fourth stopper element;
   wherein the first terminal position is different from the second terminal position;
   wherein the range of motion where the first movable portion moves between the first terminal position and the second terminal position is the first range of motion.

4. The optical system as claimed in claim 3, further comprising:
   a third stopper assembly defining the movement of the second movable portion relative to the first movable portion, comprising:
   a fifth stopper element fixedly disposed at the second movable portion; and
   a sixth stopper element, corresponding to the fifth stopper element, fixedly disposed at the first movable portion;
   wherein when the second movable portion is in a third terminal position relative to the first movable portion, the fifth stopper element is in direct contact with the sixth stopper element; and
   a fourth stopper assembly defining the movement of the second movable portion relative to the first movable portion, comprising:
   a seventh stopper element fixedly disposed at the second movable portion; and
   an eighth stopper element, corresponding to the seventh stopper element, fixedly disposed at the first movable portion;
   wherein when the second movable portion is in a fourth terminal position relative to the first movable portion, the seventh stopper element is in direct contact with the eighth stopper element;
   wherein the third terminal position is different from the fourth terminal position;

wherein the range of motion where the second movable portion moves between the third terminal position and the fourth terminal position is the third range of motion.

5. The optical system as claimed in claim 4, wherein:
when the fifth stopper element and the sixth stopper element are in contact, the first movable portion may carry the second movable portion in a first motion in a first dimension;
when the seventh stopper element and the eighth stopper element are in contact, the first movable portion may carry the second movable portion in a second motion in the first dimension, wherein the first motion and the second motion are in opposite directions.

6. The optical system as claimed in claim 5, wherein the first driving assembly drives the first movable portion to move, and changes the focal lengths of the first optical element and the second optical element, thereby performing the function of zooming;
wherein the second driving assembly drives the second movable portion to move, and changes the image planes of the first optical element and the second optical element, thereby performing the function of focusing.

7. The optical system as claimed in claim 6, wherein the first driving assembly drives the first movable portion to move before the second driving assembly drives the second movable portion to move, so that the optical system performs the function of zooming before performing the function of focusing.

8. The optical system as claimed in claim 1, further comprising:
a first guiding structure guiding the first movable portion to move relative to the fixed portion in a first dimension, wherein the first guiding structure comprises a first guiding element with a rod structure, extending in a first direction, and fixedly disposed at the fixed portion.

9. The optical system as claimed in claim 8, further comprising:
a second guiding structure guiding the second movable portion to move relative to the first movable portion in the first dimension, wherein the second guiding structure comprises a second guiding element with a rod structure, extending in the first direction, and fixedly disposed at the first movable portion or the second movable portion.

10. The optical system as claimed in claim 9, wherein the first guiding structure and the second guiding structure do not overlap when viewed in a second direction that is perpendicular to the first direction.

11. The optical system as claimed in claim 10, wherein the first guiding structure and the second guiding structure at least partially overlap when viewed in a third direction that is perpendicular to the first direction and the second direction.

12. The optical system as claimed in claim 8, wherein the first guiding structure and the first piezoelectric unit at least partially overlap when viewed in a second direction that is perpendicular to the first direction.

13. The optical system as claimed in claim 1, wherein the second driving assembly provides a second driving force via a second piezoelectric unit, and the second movable portion is driven by the second driving force to move relative to the first movable portion.

14. The optical system as claimed in claim 13, wherein the first piezoelectric unit and the second piezoelectric unit are located on the same side of the optical axis when viewed in the direction of the optical axis.

15. The optical system as claimed in claim 14, wherein the first piezoelectric unit and the second piezoelectric unit at least partially overlap when viewed in the direction that is perpendicular to the optical axis.

16. The optical system as claimed in claim 13, wherein the first piezoelectric unit and the second piezoelectric unit are located on different sides of the optical axis when viewed in the direction of the optical axis.

17. The optical system as claimed in claim 13, wherein the first driving assembly further comprises:
a first resilient element fixedly connected to the first movable portion; and
a friction element, connected to the first resilient element, and affixed to the first piezoelectric unit by a first clamping force;
wherein the first driving assembly secures the position of the first driving assembly relative to the first movable portion via the first resilient element and the friction element.

18. The optical system as claimed in claim 17, wherein the second driving assembly further comprises:
a second resilient element fixedly connected to the second movable portion;
wherein the second resilient element is affixed to the second piezoelectric unit by a second clamping force, wherein the second driving assembly secures the position of the second driving assembly relative to the second movable portion via the second resilient element;
wherein the first clamping force is greater than the second clamping force.

19. The optical system as claimed in claim 1, wherein the second driving assembly provides a second driving force via an electromagnetic unit, and the second movable portion is driven by the second driving force to move relative to the first movable portion;
wherein the first piezoelectric unit and the electromagnetic unit are located on different sides of the optical axis when viewed in the direction of the optical axis.

* * * * *